Sept. 8, 1942.  W. E. BAKER  2,294,951
PULLEY
Filed Jan. 2, 1941  3 Sheets-Sheet 1

Inventor
William E. Baker
By L. F.[signature]
Attorney

Sept. 8, 1942.  W. E. BAKER  2,294,951
PULLEY
Filed Jan. 2, 1941   3 Sheets-Sheet 2

Inventor
William E. Baker
By L. F. Randolph
Attorney

Sept. 8, 1942.  W. E. BAKER  2,294,951
PULLEY
Filed Jan. 2, 1941  3 Sheets-Sheet 3
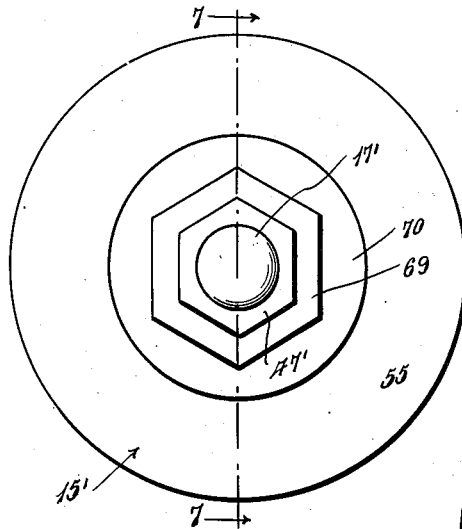
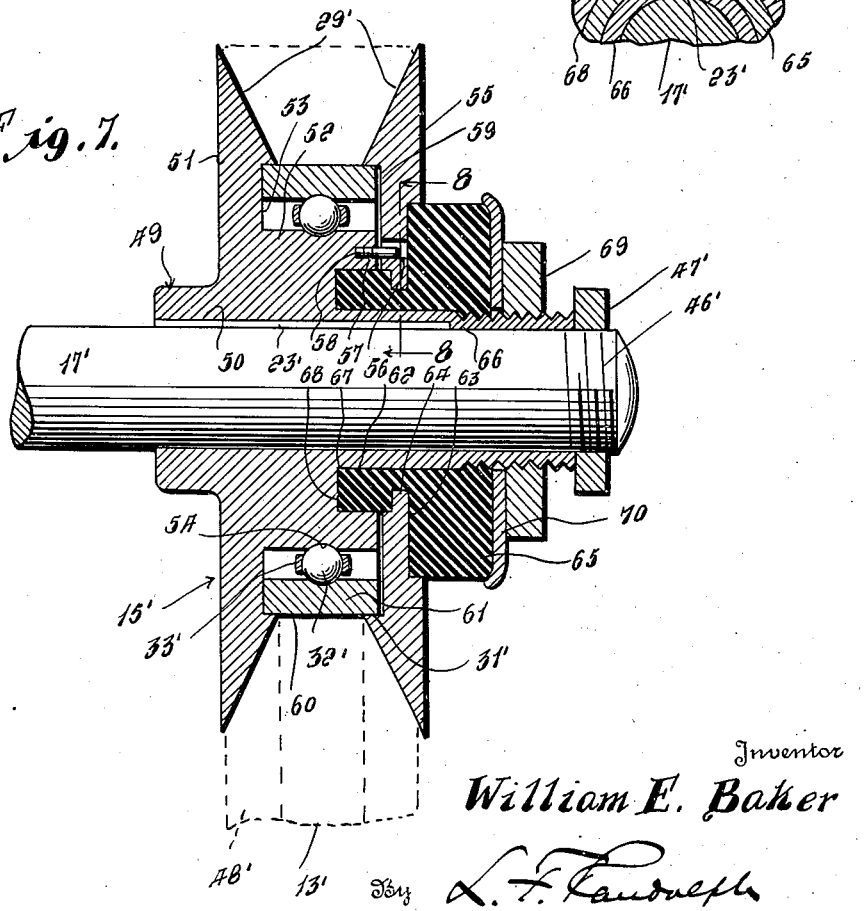
Inventor
William E. Baker
By L. F. Randolph
Attorney Patented Sept. 8, 1942

2,294,951

UNITED STATES PATENT OFFICE 2,294,951

PULLEY

William E. Baker, Chickasha, Okla., assignor of one-third to Albert L. Baker and Sylvia May Baker, both of Chickasha, Okla.

Application January 2, 1941, Serial No. 372,911

4 Claims. (Cl. 74—230.17)

This invention relates to an improved speed governing pulley adapted to drive or be driven by a V-belt and connected to a shaft for driving said shaft and/or for being driven thereby, and provided with means for limiting the speed of rotation of the belt or for limiting the speed of rotation of the pulley.

More particularly, it is an aim of the invention to provide a speed governing pulley for use on generators and alternators of motor vehicles for preventing the armature shafts thereof from being driven at excessive speed.

Still another aim of the invention is to provide a pulley especially adapted for use on alternators of motor vehicles used for supplying alternating current to loud speakers and other electrical devices having means for governing the speed of rotation of the armature shaft of the alternator to cause it to be driven at a uniform speed to thereby prevent the alternating and voltage of the current from varying when the speed of rotation of the main drive shaft pulley varies.

More particularly, it is an object of the invention to provide a novel construction of pulley for V-belts having flanges for normally engaging the belt, one of said flanges being arranged to yield away from the other flange, means forming a part of the pulley and disposed between the flanges and arranged to turn freely relatively thereto, for engaging the belt when the flanges are spread to permit the belt to move with greater speed than the pulley.

Figure 1:
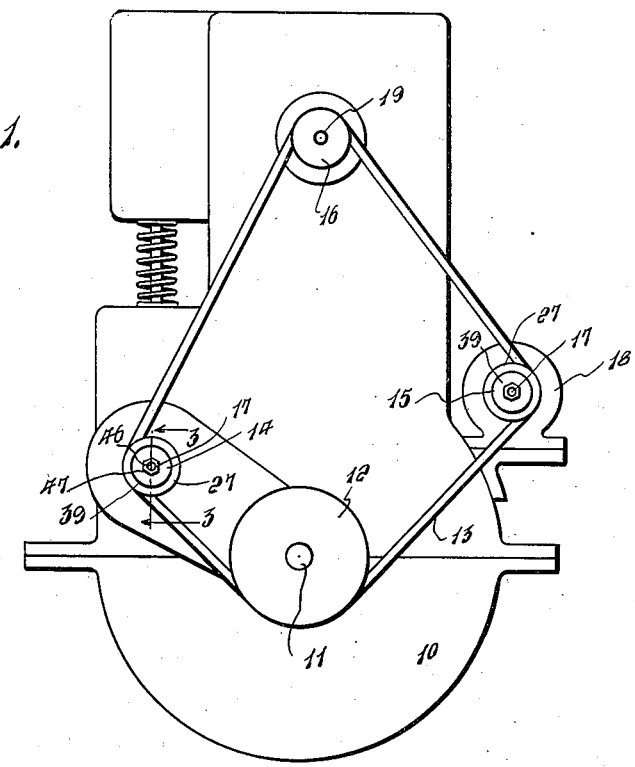
Figure 2:
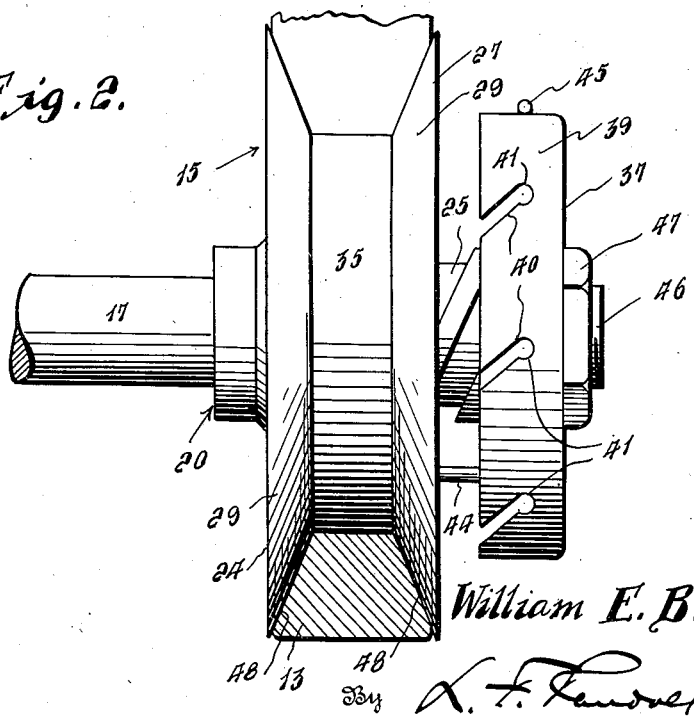
Figure 3:
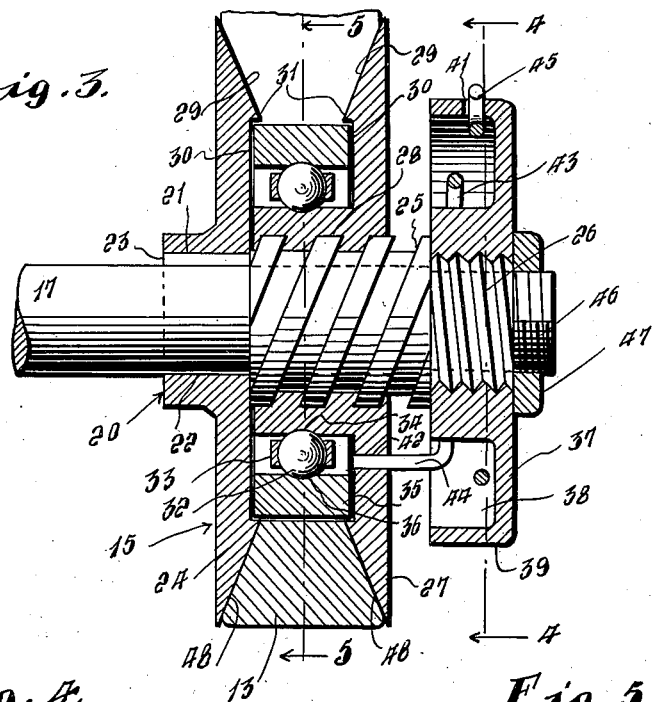

Other objects and advantages of the invention will hereinafter become more fully apparent from the following description of the drawings, which illustrate preferred embodiments thereof, and wherein:

Figure 1 is a front elevational view of an internal combustion engine and showing two of the improved pulleys driven by a belt driven from the main drive shaft pulley, Figure 2 is a side elevational view, on an enlarged scale, of one form of the speed governing pulley, Figure 3 is an enlarged vertical sectional view, partly in elevation, of the same taken substantially along the plane of the line 3—3 of Figure 1.

Figure 4:
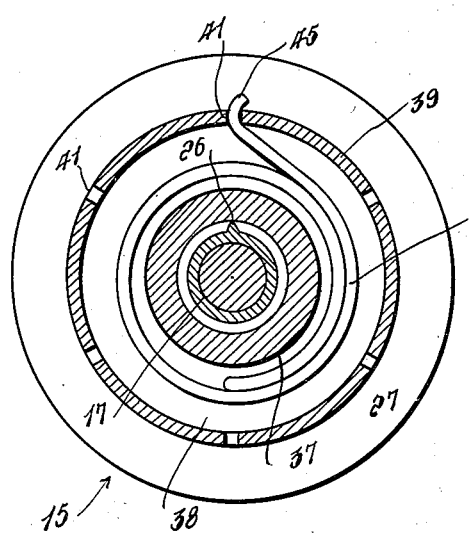
Figure 5:
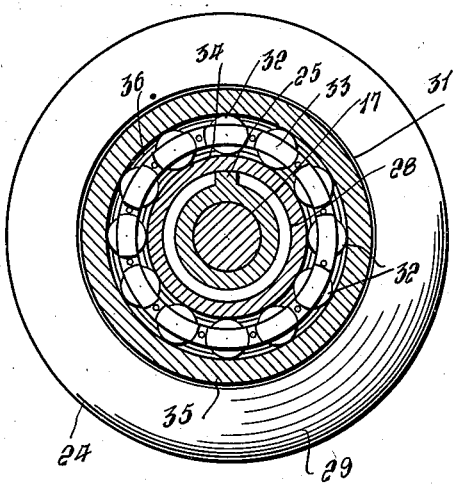

Figures 4 and 5 are transverse sectional views, on a reduced scale, taken substantially along the planes of the lines 4—4 and 5—5, respectively, of Figure 3, Figure 6 is an end view in elevation of another form of the pulley, Figure 7 is a view similar to Figure 3 of the second form of the pulley, taken substantially along the plane of the line 7—7 of Figure 6, Figure 8 is a sectional view taken substantially along the plane of the line 8—8 of Figure 7.

Referring more particularly to the drawings, wherein like reference characters designate like or corresponding parts throughout the different views, Figure 1 illustrates one application of the invention wherein 10 designates generally an internal combustion engine of a motor vehicle having a crankshaft 11 provided with a pulley 12 for driving a V-belt 13 which belt is trained over pulleys 14, 15 and 16 for driving said last mentioned pulleys. Pulley 14 is keyed to the armature shaft of a current alternator, not shown, which is adapted to furnish alternating current to a loud speaker or other alternately current appliances associated with the vehicle, not shown, which is driven by the engine 10, the pulley 15 is keyed to the armature shaft 17 of a conventional generator 18 and the pulley 16 is keyed to the driven shaft 19 of the water pump of the engine. It is to be understood that the pulleys 14 and 15, which are constructed in accordance with the invention, may be used for various power transmitting means and may be connected either to a driven or driving shaft and that the application of the pulleys, as illustrated in Figure 1 is only intended to illustrate one application for which the invention is adapted.

The pulleys 14 and 15, each of which is constructed in accordance with the invention may be constructed either in accordance with the invention as disclosed in Figures 2 to 5 or in the other form as shown in Figures 6 to 8. Assuming that the pulley 15 is of the form shown in Figures 2 to 5, the pulley, designated generally 15, as best seen in Figure 3, includes a hub, designated generally 20, which is adapted to engage the shaft 17 and which is provided with a longitudinally disposed groove 21 which opens into the bore 22 thereof for engaging a key 23 which is secured to the shaft 17 for keying the pulley 15 thereto.

The pulley 15 is provided with a flange 24 which is formed integral with the hub 20 and which projects outwardly therefrom adjacent the inner end thereof. The hub 20 is provided with an externally threaded intermediate portion 25 which, as illustrated, is provided with a left hand thread and a restricted threaded portion 26, at its outer end, which is provided with a right hand thread.

The pulley 15 is provided with a second flange 27 which is provided with an inner ring portion 28 which extends to the inner side thereof and which is internally threaded for engaging the threads of the portion 25 for mounting the flange 27 on the hub 20. The flanges 24 and 27 are provided, adjacent their outer edges, with the inner opposed faces 29 which diverge outwardly. The converging inner portions of the faces 29 are offset inwardly of the adjacent sides 30 of the flanges 24 and 27 to form the inwardly facing shoulders 31.

A plurality of ball bearings 32 are mounted in a cage 33 and are disposed around the ring portion 28 which is provided with an annular groove 34 in its outer side in which the ball bearings 32 seat and which forms an inner race for the ball bearings. A ring member 35, forming an outer race, and which is disposed around the ball bearings 32 and race 33, is provided with an annular groove 36 on its inner side, corresponding to the groove 34 and in which the ball bearings 32 are adapted to engage. The ball bearings and cage and the ring member 35 are disposed between the sides 30, which are substantially parallel to one another, and the race member 35 is of a width slightly less than the normal space between the sides 30 and is disposed with its side edges arranged within and slightly spaced from the shoulders 31. The outer side of the race or ring member 35 combines with the faces 29 of the flanges 24 and 27 to form the V-pulley 15 over which is adapted to be trained the V-belt 13.

A nut 37 is provided with a threaded bore for engaging the threaded portion 26 of the hub 20 and is provided with an annular recess 38 which opens toward the outer side of the flange 27 and which extends to adjacent the annular periphery 39 of the nut 37. As best seen in Figure 2, the periphery 39 is provided with a plurality of circumferentially spaced slots 40 which open outwardly of the inner, free edge of the periphery 39 and which are disposed obliquely thereto and which extend inwardly of the periphery 39 in a direction corresponding to the direction in which the nut 37 is turned for tightening it on the threaded portion 26 and in a direction opposite to that in which the flange 27 is turned for screwing it down on the threaded portion 25. The slots 40 are provided with enlarged offset openings 41. The flange 27 is provided with an opening 42 which extends transversely therethrough and which opens into the space between the race members 28 and 35. A strand of relatively heavy gage resilient wire 43, as best seen in Figure 4, is coiled substantially one and one-half times within the recess 38 and is provided with an end 44 which projects laterally from the recess 38 and through the opening 42. The strand 43 is provided with an opposite curved outwardly projecting end 45 which is adapted to be inserted through one of the slots 40 for engaging the opening 41 thereof, as best seen in Figures 3 and 4. The outer end of the armature shaft 17 is threaded, as seen at 46, for receiving a nut 47 which forms a lock nut for engaging against the outer side of the nut 37 for holding it in position when screwed down onto the threaded portion 26 of the hub 20. Nut 47 also retains the pulley 15 in a position on shaft 17 so that its groove 21 will engage the key 23.

Assuming that the pulley 15 is assembled, as seen in Figure 3, and that the belt 13 is turning so as to turn the pulley in a clockwise direction, as seen in Figure 5, the flanges 24 and 27 are normally spaced so that the complementary sides 48 of the belt 13 will frictionally engage the faces 29 and be held out of engagement with the outer side of the ring member 35 so that the frictional engagement of the belt 13 with the faces 29 will turn the pulley for revolving the shaft 17. It will be noted that the pulley 15 will thus be driven in a direction to tend to unscrew the flange 27 from the threaded portion 25 of the hub 20. However, the resilient wire 43, the end 45 of which is anchored in an opening 41 will yieldably hold the flange 27 to prevent it from being unscrewed by the pull of the belt 13 until the speed of the belt 13 increases to a point so that the back pull or resistance to rotation of the shaft 17 will overcome the resistance of the spring wire 43 to permit the belt 13 to turn the flange 27 relatively to the hub 20 to move it away from the flange 24 to cause the belt 13 to engage the ring or race member 35 which, being mounted to rotate freely relatively to the flanges 24 and 27, will permit the belt 13 to slide relatively to the flanges. Of course, as soon as the belt 13 begins to slide relatively to the flange 27 it will no longer frictionally engage the face 29 thereof so that the tension of the spring wire 43 will turn the flange 27 in the opposite direction for screwing it back down onto the portion 25 for returning it to a position to frictionally engage the belt 13. In this manner, regardless of the speed with which the belt 13 is moving the shaft 17 and pulley 15 will not be driven faster than a certain speed governed by the tension of the spring wire 43. The tension of the spring wire 43 can be varied by positioning its end 45 in d'fferent openings 41 and by turning the nut relatively to the flange 27 to either increase or decrease the tension of the spring wire 43 to increase or decrease, respectively, the speed at which the armature shaft 17 can be revolved by the belt 13.

Obviously, the pulley 15 could be mounted on a driving shaft instead of on a driven shaft, in which case the pulley would act to limit the speed at which the belt could be driven regardless of the speed at which the driven shaft might be revolving so that the belt could not be driven beyond a certain speed irrespective of the fact that the driving shaft might be revolving at a greater speed.

Figures 6, 7 and 8 illustrate another embodiment of the pulley, designated generally 15' which could obviously be substituted for either or both of the pulleys 14 and 15 in Figure 1. The pulley 15' is provided with a hub 49 adapted to be disposed on an armature shaft 17' and having a groove 50 opening into the bore thereof for engaging a key 23' on the shaft 17' for keying the pulley 15' to the shaft 17'. The hub 49 is provided with an integral flange 51, adjacent its inner end. The hub 49 is also provided with an enlarged annular portion 52 which projects outwardly from the side 53 of the flange 51 toward the outer end of the hub 49 and the outer side of which is provided with an annular groove 54 forming an inner race for ball bearings and cage 32' and 33', respectively, which are mounted therearound. The pulley 15' also includes a second flange 55 which is disposed on the outer side of the portion 52 and which is provided with a transverse opening 56 for receiving a pin 57 which projects from the outer side of the portion 52 and which has one end in threaded engagement with a threaded recess 58 thereof. The diameter of the opening 56 is substantially greater than that of the pin 57 to permit the flange 55 to turn slightly relatively to the hub 49.

The pin and opening connection 57, 56 slidably connects the flange 55 to the hub 49 so that the flange 55 can slide toward and away from the flange 51 and will be caused to revolve therewith when the pin 57 is in engagement with the opening 56.

The flanges 51 and 55 are provided with inner faces 29' corresponding to the faces 29 and forming the shoulders 31' corresponding to the shoulders 31. A portion of the side 59 of the flange 55 is disposed in opposed, substantially parallel relationship to the side 53 and between said sides is disposed the ball bearings 32' and cage 33'. A ring or race member 60 having an annular inwardly opening groove 61 is disposed between the sides 53 and 59 and around the ball bearings 32' which engage the groove 61 and within the shoulders 31'.

The annular portion 52 is provided with an annular outwardly opening groove 62. The flange 55 is provided at its outer side with an annular restricted portion 63 which opens outwardly of the outer side thereof and the flange 55 is also provided with an annular inwardly projecting rib 64. A yieldable member 65, preferably of rubber, is disposed around the portion 66 of the hub 49 and is provided with a portion 67 to engage the groove 62 and having an annular outwardly opening groove 68 for receiving the rib 64. The inner side of the resilient member 65 seats in the recess 63 and is attached to the flange 55 by the rib and groove connection 64 and 68, respectively.

The outer end of the hub portion 66 is threaded to receive a nut 69 and a washer 70 is disposed in front of the nut 69 for bearing against the outer side of the resilient member 65 for urging it and the flange 55 toward the flange 51 and the hub portion 52. The outer end of the shaft 17' is threaded at 46' to receive a nut 47' for retaining the pulley 15' in position on the shaft 17' and with its screw 50 engaging the key 23'.

From the foregoing it will be obvious that the operation of the pulley 15' is the same as that of the pulley 15. Assuming that the pulley 15' is being driven in a clockwise direction by the belt 13', as seen in Figure 6, or the belt 13' may be revolving in the opposite direction for turning the pulley counterclockwise, as the pulley 15' will function in the same manner regardless of which direction it is driven, the yieldable member 65 will urge the flange 55 toward the flange 51 for causing the faces 29' to frictionally engage the faces 48' of the belt 13' for driving the pulley. When the speed of rotation of the belt 13' is increased sufficiently to increase the back pull or resistance of the shaft 17' sufficiently to overcome the tension on the flange 55, produced by the resilient member 65, flange 55 will slide outwardly of the hub 49 and away from the flange 51 to permit the belt 13' to engage the race member 60 and to release it from frictional engagement with the sides or faces 29' so that the belt 13' can slide freely relatively to the pulley 15'. Of course, as in the operation of the pulley 15 when this occurs to reduce the speed of rotation of pulley 15' and shaft 17' the resilient member 65 will urge the flange 55 back toward the flange 51 so that the faces 29' will frictionally engage the faces 48' and in this manner the pulley 15' will be prevented from being driven faster than a certain speed.

The nut 69 can be tightened to increase the pressure of the resilient member 65 so that greater back pressure or resistance of the shaft 17' will be necessary to move the flange 55 outwardly to thereby enable the pulley 15' and shaft 17' to be driven at a greater speed or the speed at which the shaft 17' and pulley 15' may be driven can be reduced by screwing the nut 69 back on the threaded end of the portion 66 to reduce the pressure exerted by the resilient member 65 against the flange 55 for producing the opposite result.

Various modifications and changes are contemplated and may obviously be resorted to as only a preferred embodiment of the invention has been disclosed.

I claim as my invention:

1. A speed governing V-pulley over which a V-belt is adapted to be trained, said pulley including a hub having a flange adjacent its inner end, said hub having an intermediate threaded portion, a flange having a threaded bore for engaging said threaded portion, said flanges having opposed outwardly flared sides for engaging sides of the V-belt, said belt being adapted to turn in a direction for unscrewing the last mentioned flange from the hub to move it away from the other flange, a member mounted on the outer end of the hub and detachably secured thereto, and a coil spring wound around a portion of said member and having one end detachably anchored thereto and its opposite end anchored in the last mentioned flange to turn therewith, said spring being under tension and being wound in a direction to urge the last mentioned flange to turn in a direction, opposite to the direction in which it is rotated by the belt.

2. A pulley as in claim 1, the outer end of the hub being threaded in the opposite direction to its intermediate threaded portion, said member comprising a nut for threadily engaging the outer end of the hub.

3. A pulley as in claim 1, and anti-friction means turnably mounted in the pulley and disposed between the flanges and inwardly of the faces, engaged by the belt, for supporting the belt when the second mentioned flange is moved away from the first mentioned flange.

4. A pulley as in claim 1, said member comprising a disk having an inwardly opening annular recess in which the spring is wound, the periphery of the disk having a plurality of notches for selectively receiving the first mentioned end of the spring for selectively tensioning the spring, said notches opening outwardly of the inner edge of the periphery of the disk.

WILLIAM E. BAKER.